United States Patent [19]
Bohnet et al.

[11] Patent Number: 5,049,011
[45] Date of Patent: Sep. 17, 1991

[54] ROTARY BORING TOOL WITH INDEXABLE CUTTER CHIPS

[75] Inventors: Siegfried Bohnet, Mössingen; Werner Gräfe, Reutlingen, both of Fed. Rep. of Germany

[73] Assignee: Cubic Defense Systems Inc., San Diego, Calif.

[21] Appl. No.: 359,275

[22] Filed: May 31, 1989

[30] Foreign Application Priority Data

Dec. 15, 1988 [DE] Fed. Rep. of Germany ....... 3842209

[51] Int. Cl.⁵ .................................... B23B 51/00
[52] U.S. Cl. ................................ 408/223; 408/199; 408/713
[58] Field of Search ............... 408/713, 223, 705, 188, 408/199; 407/67, 60, 33, 46, 47; 175/410, 398

[56] References Cited

U.S. PATENT DOCUMENTS

| | | |
|---|---|---|
| 2,074,951 | 3/1937 | Zublin .................. 175/397 |
| 3,279,035 | 10/1966 | Johnson ............... 407/47 X |
| 3,540,323 | 11/1970 | Rishel .................... 408/188 |
| 3,816,018 | 6/1974 | Hlocky ................. 408/713 X |
| 4,124,328 | 11/1978 | Hopkins ............... 408/713 X |
| 4,131,383 | 12/1978 | Powers ................... 408/199 |
| 4,149,821 | 4/1979 | Faber ..................... 407/114 |
| 4,303,358 | 12/1981 | Grusa .................. 408/713 X |
| 4,367,991 | 1/1983 | Grafe et al. ......... 408/713 X |
| 4,563,113 | 1/1986 | Ebenhoch ............. 408/713 X |
| 4,642,001 | 2/1987 | Gill et al. ............ 408/713 X |
| 4,645,384 | 2/1967 | Shimomura et al. ... 408/713 X |
| 4,648,760 | 3/1987 | Karlsson et al. ..... 408/713 X |
| 4,714,383 | 12/1987 | Shimomura et al. ... 408/713 X |

FOREIGN PATENT DOCUMENTS

| | | |
|---|---|---|
| 2358048 | 11/1973 | Fed. Rep. of Germany ...... 408/223 |
| 2555979 | 6/1977 | Fed. Rep. of Germany . |
| 2751255 | 5/1978 | Fed. Rep. of Germany . |
| 2815571 | 10/1978 | Fed. Rep. of Germany ...... 408/223 |
| 206094 | 1/1984 | German Democratic Rep. ..................... 408/203 |
| 99287 | 8/1979 | Japan .................... 408/233 |
| 625443 | 9/1981 | Switzerland . |
| 2132517 | 7/1984 | United Kingdom . |

Primary Examiner—Gary F. Paumen
Assistant Examiner—Robert Schultz

[57] ABSTRACT

To permit boring with replaceable cutter elements (10, 10a, 10b), particularly into materials where, upon withdrawal of the boring tool from a bore hole (40), grooves or scratches are to be avoided, two cutter elements are positioned on a fluted cylindrical body (1), the cutter elements being so located that the inner cutter element (10b) is positioned on the body so that an effective cutting edge (19) thereof is radially inwardly of the theoretical circle (33) formed by the outer cutter element (10a) upon rotation of the tool, the cutting corner of each cutter element is formed as a relieved or chamfered corner (15) and forms a chopped corner cutting edge (22). Both cutter elements (10a, 10b) are so positioned on the body that the chopped corner cutting edges are located at least in part on a diametrical plane (34) passing through the axis of rotation (31) of the body, and the inner cutter element, additionally, is so located that its chopped corner cutting edge (22) is located in the immediate vicinity of, at, or intersects the axis of rotation (31) of the body. The outer cutter element is so positioned that a corner cutting edge portion (23) projects beyond the circumference of the boring tool and it is oriented such that the main cutting edge portion (19) thereof extends along a chord with respect to the theoretical circle (33).

19 Claims, 6 Drawing Sheets

ROTARY BORING TOOL WITH INDEXABLE CUTTER CHIPS

Reference to related patent, the disclosure of which is hereby incorporated by reference: U.S. Pat. No. 3,966,349.

FIELD OF THE INVENTION

The present invention relates to boring tools having a tool shank or tool body in which preferably indexable and replaceable cutter chips are inserted. The tool is especially adapted for boring holes in workpieces of materials which are considerable softer than the chips, such as plastics, metals of various kinds, and which, upon finishing boring, should have a smooth bore hole surface.

BACKGROUND

Boring tools with cylindrical cutter chips are well known. Usually, a fluted cylindrical body which, upon rotation, defines a theoretical circle, has polygonal cutter elements, typically essentially flat, plate-like cutter elements inserted therein. The cutter elements may be essentially square, triangular, or otherwise polygonal in aspect. The cutter elements have cutting corners at the intersections of main or effective cutting edges. The cutter elements are fitted in suitable recesses in the body or shank of the boring tool. The cutter elements are radially staggered along an essentially diametrical line. A radially outer cutter having an outer cutting corner projects radially from the cutter body or shank. The main cutting edge of this cutting element may have its effective cutting edge oriented in a chord with respect to the theoretical circle formed by the cutter, that is, as the outer cutting edge rotates. A second, or inner cutter element is so positioned that its effective cutting edge intersects or comes close to the vicinity of the axis of rotation of the boring tool. The cutter elements are so located on the tool body that, in operation of the tool, and upon contact of the cutter elements with the workpiece when boring a bore hole, a radially outwardly (with respect to the axis of rotation) directed force component is generated in the tool body.

U.S Pat. No. 3,966,349, Asman describes, in general, such a boring tool. The two cutter elements have their radially outer cutting corners located on a common circle of rotation. Support strips or ridges are provided, located on the tool shank and parallel to the axis of rotation thereof, positioned adjacent the cutting corners. The cutting tool, thus, can be supported against the wall of the bore hole by these strips in combination with a radially elastically supported engagement strip. The engagement strip is positioned in the effective direction of the resulting radial component of the cutting forces. Its surface is so constructed that when it is pressed against the wall of the bore hole, in operation of the tool, it can still run on a lubricating film in the bore hole and will not destroy this lubricating film.

The support rail or support strip places the support elements engaging the cutter bits with some bias force with respect to the inner wall of the bore hole. If the workpiece is made of a material which is sensitive to scratching or, in general, substantially softer than the cutter chips, the danger may arise that as the boring tool is withdrawn from the bore which has been made, scratches or grooves may be formed in the wall of the bore hole.

The cutter insert which is positioned to intersect the axis of rotation of the boring tool has a main cutting edge which is longer than the radius of the boring tool, in other words, it extends from a radially outwardly cutting corner over and beyond the center or axis of rotation of the shank. This requires a comparatively wide cutter chip or a cutter element which is difficult to make for large bore holes, particularly when it is to be made of hard metal. Economical manufacture thereof is no longer possible. The support rails which are in engagement with the cutting edges predetermine the position of the cutter chips in the boring tool body or shank. The support rails must always be located parallel to the axis of rotation of the tool body or shank. This, then, results in comprise solutions for design of the boring tool with respect to workpiece chip formation and chip removal as well as compromise with the cutter characteristics and conditions, especially in the region of the axis of rotation of the cutting tool. In materials which are difficult to handle, and/or subject to high boring forces, and feed speeds, the compromises are difficult to achieve.

THE INVENTION

It is an object to provide a boring tool which has high cutting efficacy, good cutting characteristics, and in which danger of damage to the inner wall of the bore hole upon withdrawal of the boring tool is reduced to a minimum.

Briefly, the boring tool is generally constructed as above referred to but does not require support rails engaging the walls of the bore hole. The cutter geometry is so arranged that a radial force component results which acts on the body of the boring tool. This force component elastically slightly deflects the tool body laterally. The inner cutter element is positioned on the tool body or shank such that its new cutting edge is radially inwardly of the theoretical circle of the outer cutter element. Both cutter elements are formed with cutting corners which are relieved or chamfered, and form a chopped corner cutting edge. The term "chopped corner cutting edge" is herein defined to mean a rounded or cut corner, that is, rather than a sharp point: in other words, a corner in which the sharp point has been cut or chopped by a line transverse to the angle formed by the adjacent cutting edges forming the corner. This line may be straight or somewhat rounded, so that the merger of the chopped corner cutting edge with the adjacent main cutting edges can be smooth or, itself, form an obtuse angle.

The outer cutter element is so located on the body that the corner cutting edge portion projects beyond the circumference of the boring tool to define a theoretical circle upon rotation of the tool. Further, the outer cutter element is so located that the main cutting edge thereof is oriented along a chord with respect to that theoretical circle.

Both cutter elements, additionally, are so located on the body that the chopped corner cutting edges are positioned at least in part on a diametrical plane passing through the axis of rotation of the body. The radially inner cutter element is so positioned on the body that its chopped corner cutting edge is located at the immediate vicinity of, at, or intersects the axis of rotation of the cutter tool body or shank.

In accordance with a preferred feature of the invention, the radially inner and/or radially outer cutter element is positioned to be slightly tilted or pivoted such that its effective cutter edge associated with the inner or outer chopped corner cutting edge is slightly tipped with respect to a plane passing through the main cutting edges. The wider side of the cutter element which forms a theoretical engagement plane includes an acute angle with a diametrical plane across the cutter body or shank and passing through the axis of rotation thereof.

This angle, at least in the outer cutter element, in cutter elements having a positive cutting geometry is, preferably, on the side of the diametrical plane which is counter or opposite the direction of rotation of the boring tool. The angle may be from between 0° to 12°.

DETAILED DESCRIPTION

Figure 1:
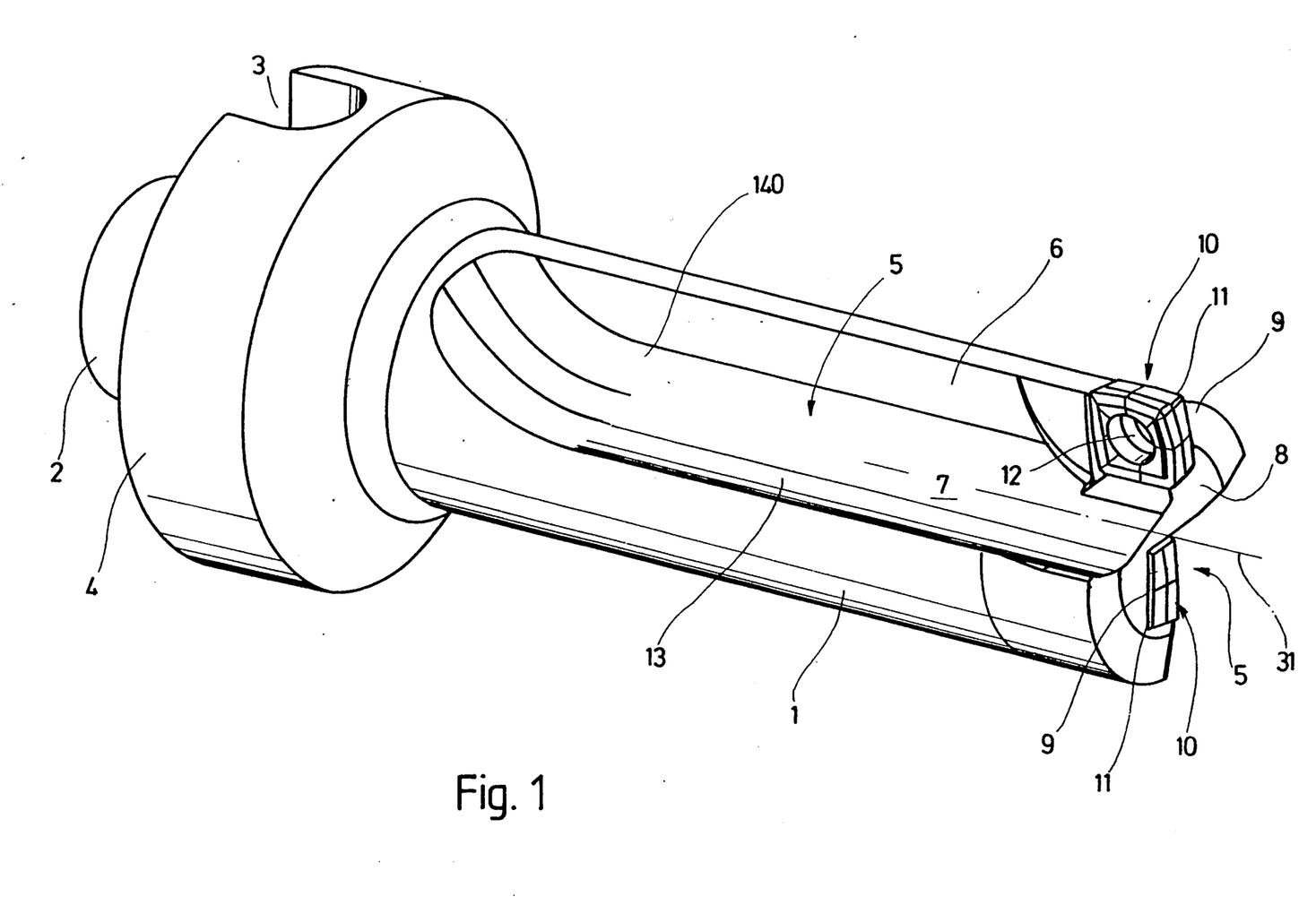
FIG. 1 is a perspective view of the boring tool in accordance with the present invention.

The boring tool of FIG. 1 has a fluted body or shank 1, which terminates in an engagement pin 2, for example for insertion in a suitable chuck or receiving bore of a drive spindle of a boring machine. A flange 4, formed with a groove 3 to receive a drive dog or the like is formed on the tool body or shank.

Figure 2:
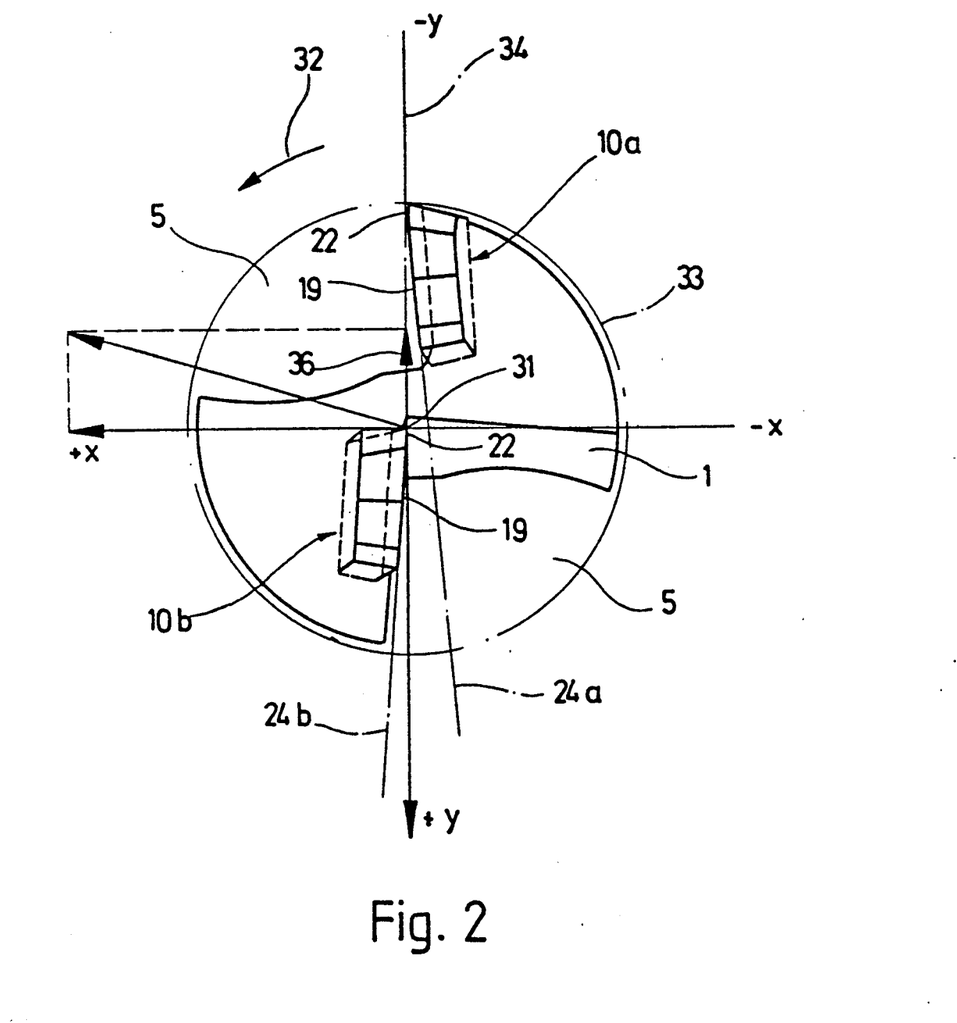
FIG. 2 is an end view of the boring tool, also showing force relationships.
Figure 3:
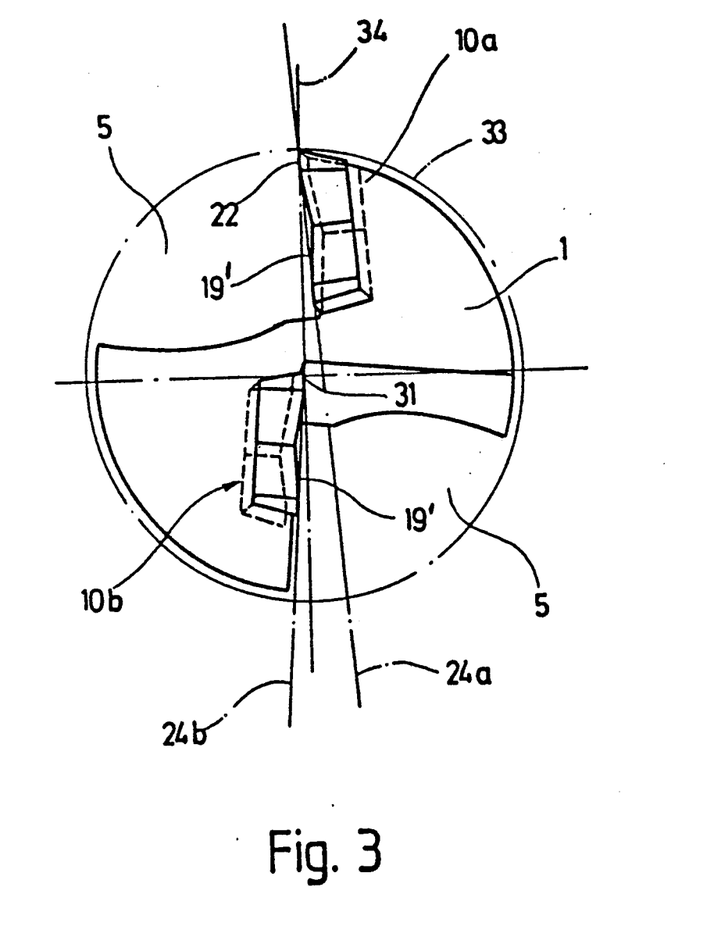
FIG. 3 is an end view similar to FIG. 2, in which the cutter chips are constructed in a modified form.

The shank 1 is made of steel and is formed with two longitudinal chip removal flutes 5, defined by essentially perpendicular side walls 6, 7 extending, as best seen in FIGS. 2 and 3, in essentially radial direction. The two chip removal walls 6, in the region of the end surface 8 of the bore shank 1, are formed with essentially rectangular recesses 9. Cutter chips 10, made of hard metal, and which are indexable, are inserted in the respective recesses 9.

Figure 5:
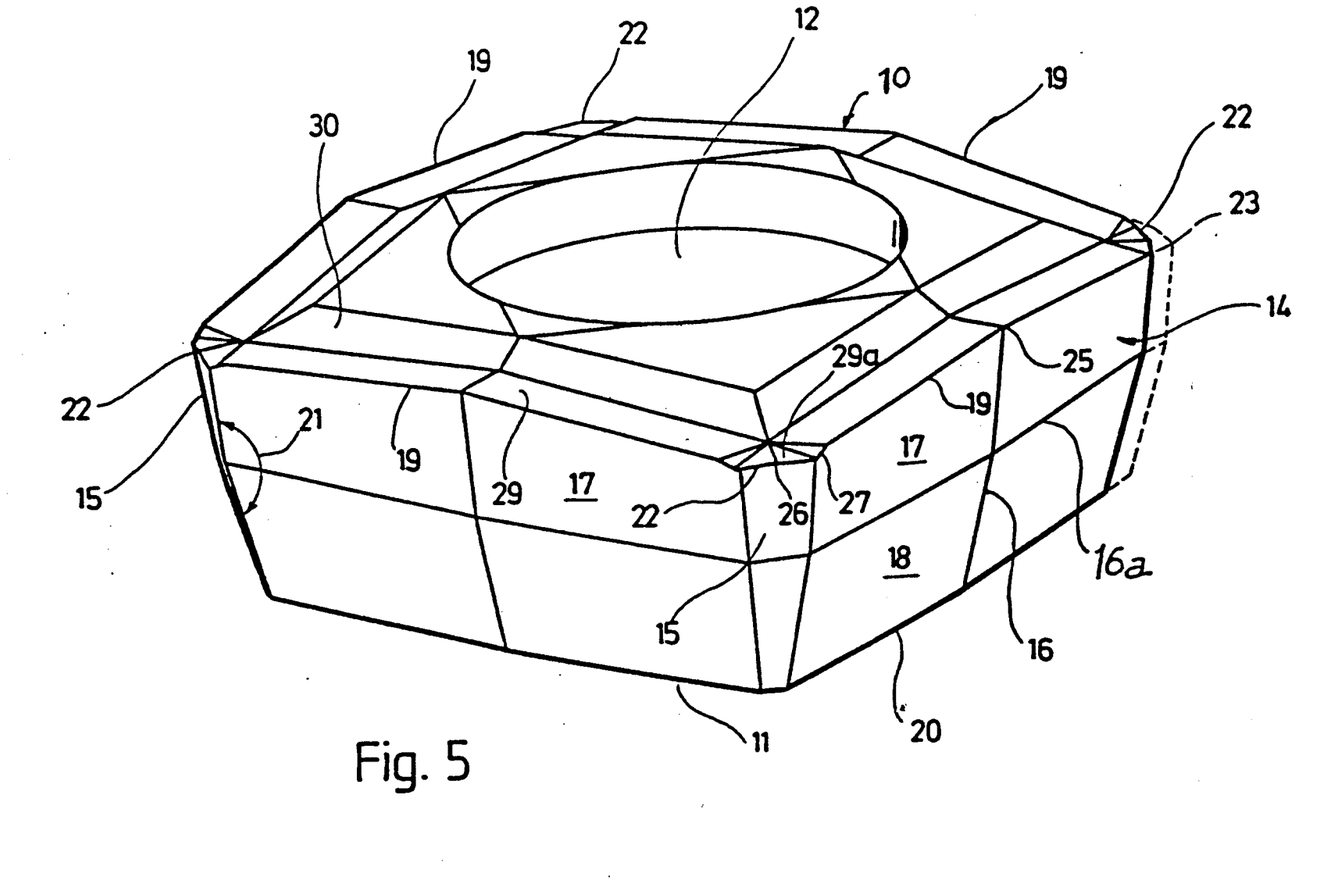
FIG. 5 is a perspective enlarged view of a cutter element used in the embodiment of FIGS. 1 and 2.
Figure 6:
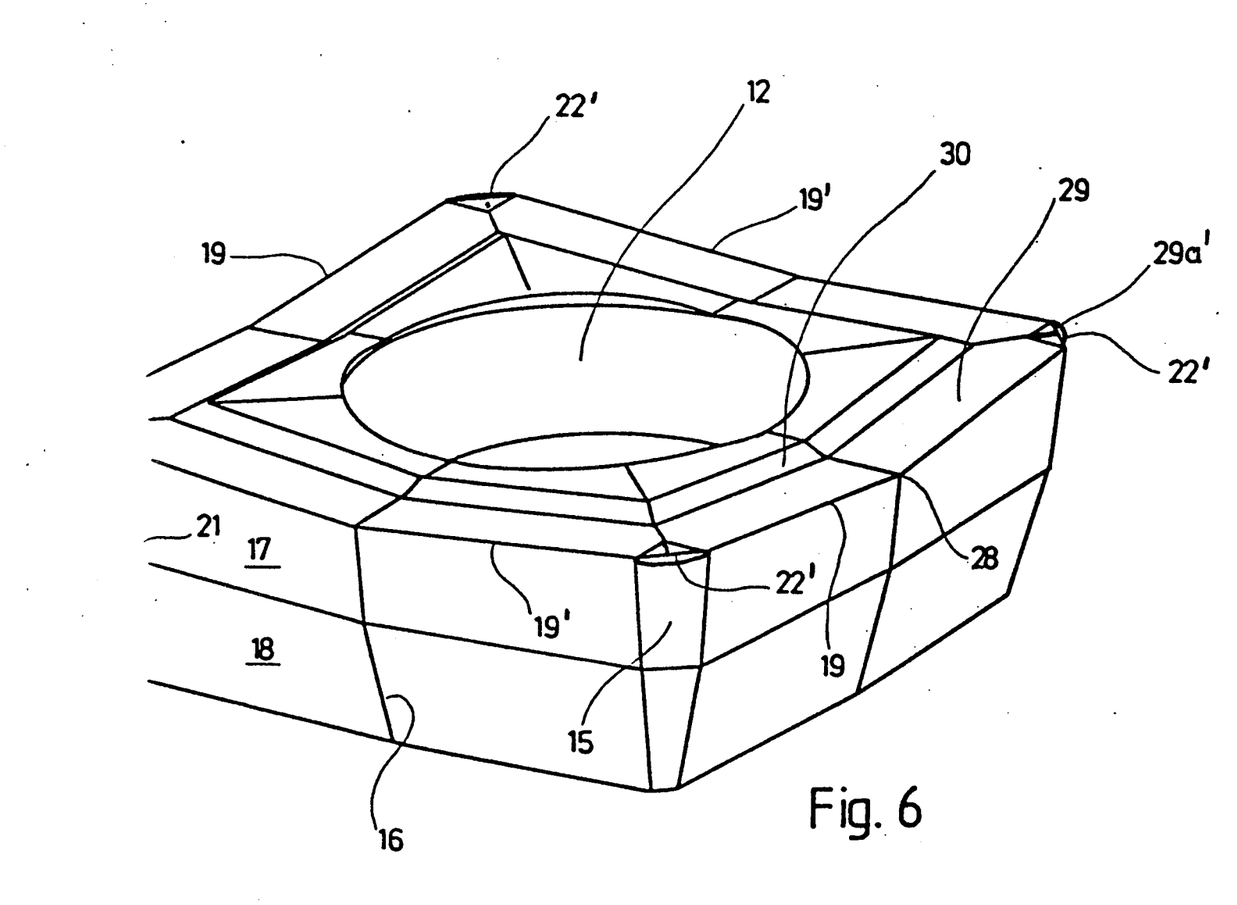
FIG. 6 is a perspective enlarged view of a cutter element used in the embodiment shown in FIG. 3.

The indexable cutter elements 10 have a central hole 12 to receive a recessed head attachment screw. The attachment screws are not shown and have been omitted from the drawings for clarity, since they can be of any suitable and well known type. Each one of the cutter elements 10, as best seen in FIGS. 5 and 6, are essentially plate-like elements having a flat engagement surface 11, to be fitted to the wall of the recess 9 by the attachment screw.

The opposite side wall 7 of the grooves 5 is curved, as best seen at 13 (FIG. 1) and rounded out at the root thereof as shown at 140 in FIG. 1.

The plate-like cutter chips 10 have an essentially octogonal base shape. Differently shaped cutter chips may be used, for example cutter chips having square or triangular base shape. Each cutter chip 10 has four regularly recurring circumferentially placed end faces 14 (FIG. 5), which are connected by corner chamfered surfaces 15, each one of which is essentially roof-shaped and formed with a separating edge 16, extending at right angle to the base surface 11 and positioned centrally between two adjacent chamfered corners 15. The four side surfaces 14 are subdivided into two adjacent side surface portions 17, 18, by a subdivision line 16a, so that the surfaces 17, 18 are staggered in the direction of the separating line 16. As best seen in FIGS. 5 and 6, the upper subdivision 17 defines or bounds a main cutting edge 19. The portion 18 intersects the base surface 11 at a corner 20. The end surface portions 17, 18 form an obtuse angle 21 with respect to each other. Likewise, the portions adjacent the separating edge 16 form an obtuse angle.

The region of the end face portions 17 are located adjacent the chamfered corners 15. The cutting edge of the element 10 is formed by the main cutting edge portion 19 and corner cutting edge portions 22, which are chopped corner cutting edges. Each corner cutting edge portion 22 connects the main cutting edges 19 in the region of the theoretical corners 23, shown in broken lines in FIG. 5, associated with the respective chamfered corners 15. The difference between the theoretical corner 23 and the chopped corner cutting edge 22 is referred to as the "chopped corner cutting edge".

All the main cutting edge portions 19 may be straight, see FIG. 2, and in common with the chopped corner cutting edges 22 that can be located in a common theoretical plane generally shown at 24 in FIG. 2 which could be thought to be placed on the associated wider side side of the chip 10 and which extends at a right angle to the axes of the attachment hole 12.

In the embodiments illustrated in FIGS. 1 and 5, the main cutter edge portions 19 which are adjacent the respective chopped corner cutting edges 22, are formed with a raised cutter region, extending in arrow-head shape with respect to the chopped corner cutting edges 22. The highest point or peak at which the adjacent straight sections of the main cutter edge portions meet is shown at 25 in FIG. 5. The chopped corner cutting edges 22, likewise, are arrow-head shaped and raised to form a central projecting cutter region, shown at 26 in FIG. 2. The main cutting edges or edge portions 19 are connected with the associated chopped corner cutting edge 22 over an inclined cutting edge region 27.

In the embodiment of FIGS. 3 and 6, the cutter elements 10' have the main cutter edge 19' adjacent the respective chopped corner cutting edges 22 depressed in concave form. The concave depressed region of the main cutter element 19' is formed by essentially straight main cutter portions meeting at the lowest point 28, see FIG. 6.

A suitably shaped cut chip receiving and chip breaking surface 29, 29' is positioned adjacent the main cutting edges 19, 19', located radially inwardly. The cut chip removal and breaking surface 29, 29' in the region of the chamfered corners is shown at 29a, 29a', FIGS. 5 and 6. The actual cut chip breaking stage or step is shown at 30 in FIGS. 5 and 6, located adjacent the cut chip removal surface 29.

The chips shown in FIGS. 2, 5 and 6 operate with positive cutting geometries. They are formed with cut chip surfaces 29, 29a, 29', 29a'. at one side, located adjacent and all the main cutting edges 19, 19' and 22,22' respectively. Each one of the indexable cutter elements 10, 10' has four main cutting surfaces 19, which can be indexed on the tool for replacement of a sharp edge if one becomes dull or damaged.

The recesses 9 in the region of the cut chip removal side wall 6 are positioned in the tool body or shank 1 at different radial distance from the axis of rotation 31 thereof. The cutter elements 10, 10' are so located on the tool body that the radially outer or first cutter element shown at 10a in FIG. 2 has its theoretical corner 23, and the actual chopped corner cutting edge 22 projecting radially over the outline of the shank or body 1. The effective chopped corner cutting edge 22 of the cutter insert 10a, upon rotation of the tool body in the direction shown by arrow 32 defines a theoretical cutting circle 33.

The inner or second cutter element 10b is located radially spaced inwardly of the theoretical circle 33. It is so positioned on the tool body 1 that the innermost chopped corner cutting edge 22 of the effective cutting edge 19 intersects the axis of rotation 31 of the shank 1. This is a suitable and preferred location. The two cutter elements 10a, 10b have the effective chopped corner cutting edges 22 in a plane which extends diametrically across the shank 1 and through the center of rotation 31 thereof. The projection of this plane is seen in FIGS. 2 and 3 at 34. The two cutter chips 10a, 10b, looked at from the end of the shank 1, are located on respectively opposite sides of this theoretical plane 34, with respect to the center axis 31 of the shank 1.

The cutter elements 10a, 10b are slightly tilted or tipped with respect to this plane 34 about the theoretical corner 23 associated with the respectively active chopped corner cutting edge 22. This is best seen by reference to FIG. 4 which is a highly schematic side view combined with a fractional sectional view to illustrate, graphically in one Figure, this tilted or tipped relationship which, otherwise, is difficult to visualize. A small acute angle, shown at 34a, 34b with respect to the cutter chips 10a, 10b, and applied to a fragmentary fractional view along lines IVa—IVa and IVb—IVb of the side view of the tool illustrates this tipping or pivoting angle. The sectional views illustrate the respective positions of the cutter elements, rotated by 90° from the central showing thereof. This tilt or tipping angle, as illustrated, is about 6°. It may vary up to 12°, but it need not necessarily be present and, therefore, may be 0°. The tilt or tipping angle 35a, 35b is taken with respect to the central diametrical plane 34 and a contacting plane 24, extending at right angles to the axis of the attachment hole 12 and associated with the main cutting edges 19 of the wider side of the respective cutter element 10a, 10b. This contacting plane 24, for the radially outer cutter element 10a, is positioned in a chord with respect to the theoretical circle 33, as clearly seen in FIG. 2. With respect to the cutter chip 10a, FIG. 2 shows this chord line at 24a. The respective angles 35a, 35 of the cutter elements 10a, 10b are at opposite sides of the diametrical plane 34. The angle 35a formed by the cutter insert 10a is on the side opposite plane 34, with respect to the direction of rotation of the shank 1, see arrow 32 in FIG. 2.

The described specific arrangement of the cutter elements 10a, 10b on the shank 1, in operation, do not result in complete compensation of cutting forces which act at right angle to the axis of rotation 31 in the X-Y plane, and do not compensate these forces with respect to the X and Y direction. As a result, a radial force component 36 (FIG. 2) will be effective in the −Y direction.

The level of this radial force component 36 depends on the position of the main cutting edges 19 and the angles 35a, 35b. It is so dimensioned or selected that the shank 1, in operation, is slightly radially outwardly deflected, and thus forms a bore hole which has a diameter just slightly larger than the theoretical bore hole diameter, defined for example by the circle 33. The thus generated radial deflection of the shank 1, in a tool of, for example, about 37 mm diameter (about 1½ inches)-,will be about 0.1 mm. Such a deflection is within the elastic region of deformation of the shank 1, so that additional radial support of the shank 1, for example in form of engagement or support strips or the like, are not necessary. It is, however, entirely possible to utilize support strips or ridges for tools having very large diameters, in order to limit the elastic deformation or deflection to a predetermined value.

In the example illustrated, the radial force component 36 extends in the −Y direction. By suitable positioning of the inner and outer cutter elements 10a, 10b, it is possible to change the direction of this force component 36.

The cutter inserts 10 are so designed that the chopped corner cutting edges 22 are formed by chamfering or cutting or chopping the theoretical corners 23. The cutting surfaces 22 need not be straight, and rather than making the chopped corner cutting edges 22 in the form of straight lines as shown, rounded chamfered corners may be used, so that the chopped corner cutting edges 22 will then be curved, which may result in a smooth transition to the main cutting edges 19.

FIG. 3 is similar to FIG. 2, and illustrates cutting chips 10' of FIG. 6 in the shank, omitting the force diagram and matter not necessary for an understanding of the alternate embodiment.

Figure 4:
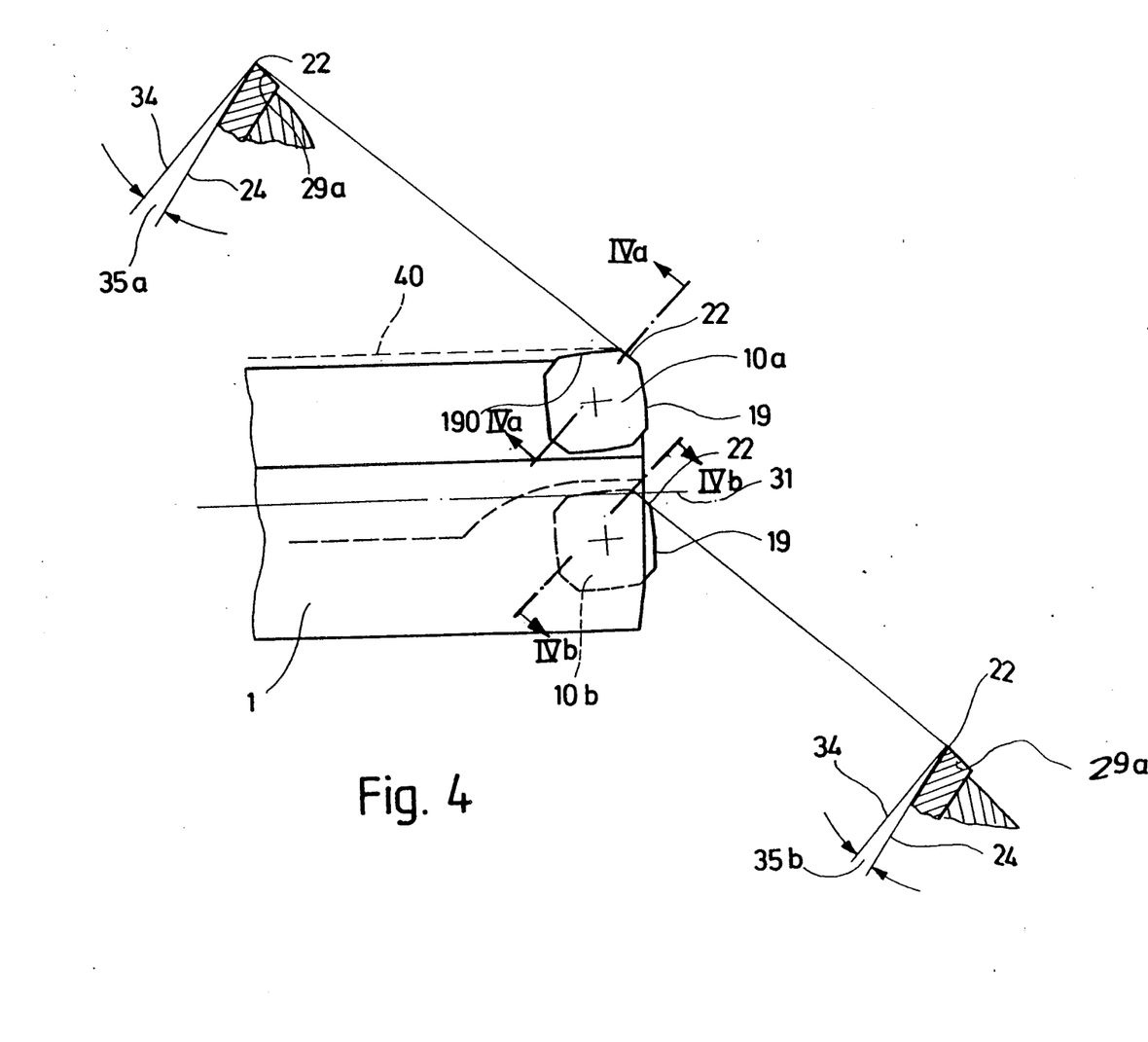
FIG. 4 is a fragmentary schematic side view with sectional representation for visualization of the position of the cutter edges with respect to the diameter of the cutter tool body or shank.

The position of the cutter elements 10a, 10b on the shank 1 can be so selected that the effective cutting edges 19 adjacent the chopped corner cutting edges 22 extend axially above the end face 8 of the shank 1, and further overlap each other radially. The outer cutter element 10a can be so placed that the main cutter edge 19 which is located axially adjacent the chopped corner cutting edge 22 which effects the cutting, can be placed in a relieved position with respect to the inner wall of the bore hole. The inner wall of the bore hole is shown in FIG. 4 at 40, and the relieved main cutting edge at 190. Thus, the cutting edge 190 does not form a radial support surface or support edge.

The shape of the main cutting edges 19, 19', as well as the chopped corner cutting edges 22, can be suitably selected, as well known, in accordance with the intended use of the tool. The cut chip removal surface 29 as well as the cut chip breaker 30 can be so arranged that the surfaces and breaker are depressions or grooves with adjacent raised ribs, for example individual grooves or tiny depressions; all well known cut chip removal arrangements and guide surfaces may be used. The main cutting edges 19, 19' can be straight or curved; the cutter elements 10 can be triangular, square, rectangular, or polygonal.

Improved cut chip breaking and stability of the cutter elements, especially when operating in somewhat softer workpieces, preferably use cutter regions of the main cutter surfaces which extend somewhat arrow-shaped to a raised or roof-shaped region with respect to the chopped corner cutting surfaces 22, as described in connection with FIG. 5; alternatively, the surfaces 22' may be depressed (FIG. 6), and in both cases have cut chip removal surfaces 29,29' associated therewith. Preferably, and when the construction of FIG. 6 is selected, the concave depressed region of the main cutting edge 19' is formed by essentially straight cutting edge portions coming together at a lowermost dip.

It has been found particularly advantageous in actual practice to use cutter elements 10 which, basically, are plate-like and have somewhat octagonal shape, with four regularly recurring side faces, each of which is raised roof-like, as described in connection with FIG. 5, so that the cutter elements have their main surfaces joined at a separating edge 16 extending transversely to the main surfaces of the plate-like element. Two surface portions 17, 18 are then preferably provided, the surface portion 17, at the edge thereof, forming the cutting edge 19, 19', respectively. The portions 17, 18 preferably are inclined with respect to each other, to form the obtuse angle 21.

The central hole 12 in the cutter elements 10 permits ready rotation of the cutter elements, thereby permitting placing of new, sharpened edges by mere loosening of the attachment screw—not shown—and indexing of the respective cutter element. The cutter elements are preferably received in suitable recesses formed in the flutes or grooves of the shank 1 of the tool, which terminates in the rounded flute root 140.

The slight radial elastic deflection of the shank, which occurs in operation, due to the force component 36 (FIG. 2), results in a bore hole which is slightly larger than the nominal bore hole which would be generated by merely measuring from the center of the axis of rotation 31 to the tip of the chopped corner cutting edge 22 of the outer cutter element 10a. As soon as the tool is stopped, and the cutting force relieved, the shank can be withdrawn axially from the bore hole without danger of forming a groove or scratching the wall of the bore hole. This very tiny or slight radial deflection thus permits boring holes in which the inner surface is to be perfectly circular and unscratched, which is of importance when boring into plastics. To permit this slight radial deflection, it is preferable not to radially support the shank, that is, to leave it free of lateral support strips and the like, although, for boring tools of very large diameter, they may be employed.

The inner cutter insert 10b, which is spaced radially within the theoretical circle 33, needs to have a width which is only wide enough to provide for overlap of the cutting edges 19 of the two elements 10a, 10b from the circumference of the theoretical circle 33 to the center of rotation of the tool. To bore holes of large diameter, and if it is not desired to increase the size of the cutter elements which, as more material is used, become expensive, it is also possible to subdivide the main cutting line into a plurality of subsections, each one cut by separate elements, so that more than two cutter elements 10 are placed along an essentially radial or chorded line, similar to lines 24a, 24b, FIG. 2. Such a multiplicity of individual cutter elements then can be placed between the radially outermost first cutter element 10a and the radially innermost second cutter element 10b, and, if desired, can be distributed also in circumferential direction. More than two such, in circumferential direction sequentially positioned first and second cutter elements may also be used in order to distribute the cutting effort on a plurality of main cutting surfaces.

Various other changes and modifications may be made, and any features described herein in connection with any one of the embodiments may be used with any of the others, within the scope of the inventive concept.

We claim:

1. Rotary boring tool for boring into a workpiece having a fluted cylindrical body (1) having a central axis (31) of rotation and which, upon rotation of the tool, defines a circle, said body having an end face (8);

at least two polygonal cutter elements (10a, 10b) fitted into said body adjacent the end face (8);

one (10a) of said cutter elements being located on said body at the radially outer position, and a second one (10b) of said cutter elements being located on said body at a radially inner position;

each cutter element having at least one cutting edge, which cutting edge includes at least one main cutting edge portion (19) extending along a side of the polygonal element and corner cutting edge portions (22) adjacent the ends of the main cutting edge portion, said outer cutter element (10a) being positioned on the body (1) with a radially outer corner cutting edge portion (22) projecting beyond the circumference of the boring tool, said outer corner cutting edge portion defining a theoretical circle (33) upon rotation of the tool about said axis (31) of rotation, wherein said boring tool comprises an arrangement to provide, in operation of the tool, a radially directed force against said tool body by reaction between the cutter elements and the workpiece, said arrangement being characterized in that the corner cutting edge portions (22) of the cutting edges of each cutter element (10a, 10b) are formed as relieved or chamfered chopped corner cutting edges (22);

the outer cutter element (10a) is positioned on the body (1) with its main cutting edge portion (19) oriented along a chord with respect to said theoretical circle (33), and wherein said chord is in a plane which does not pass through said axis (31) of rotation or the center of said theoretical circle (33);

the inner cutter element (10b) is positioned on the body with its main cutting edge portion (19) located radially inwardly of the theoretical circle (33);

both said cutter elements (10a, 10b) are positioned on the body (1) with the radially outer corner cutting edge portion (22) of the radially outer cutter element (10a) and the radially inner corner cutting edge portion (22) of the radially inner cutter element (10b) located, at least in part, on a diametrical plane (34) passing through the axis of rotation (31) of the body (1); and wherein the inner cutter element (10b) is further positioned on the body (1) with its inner corner cutting edge portion (22) located in the immediate vicinity of, or at the axis of rotation (31) of the body (1), whereby, in operation of the tool and upon contact of the cutter elements with the workpiece, when boring a bore hole (40) therein, a radially outwardly, with respect to the axis of rotation (31), directed force component is generated in the tool body.

2. The tool of claim 1, wherein said cutter elements (10a, 10b) are formed as plate-like elements having an attachment hole (12), said plate-like elements defining a theoretical contacting surface (24) extending at a right angle with respect to a central axis of said attachment hole.

3. The tool of claim 1, wherein (FIG. 6) the chopped corner cutting edges (22') have an inverted roof or inverted arrow-head shaped concave shape.

4. The tool of claim 1, wherein said polygonal cutter elements (10a, 10b) are formed with a central attachment hole (12) to permit indexing of the main cutting edges 5. The tool of claim 1, wherein the fluted cylindrical body is formed with essentially axially directed grooves (5) forming flutes, said grooves defining two side surfaces (6, 7), at least one (7) of which is curved;

and wherein said grooves are formed with recesses (9) shaped and dimensioned to receive said polygonal cutter elements and fit said polygonal cutter elements therein.

6. The tool of claim 1, wherein (FIG. 5) at least the main cutting edge portions (19) of said cutter elements (10) between two chopped corner cutting edges (22) are formed with an arrow-head or roof-shaped raised cutting sections;

and a cut chip removal surface (29) is formed on the cutter elements adjacent said main cutting edge portions.

7. The tool of claim 1, wherein the main cutting edge portions (19') of said cutter elements (10) between two chopped corner cutting edges (22') are formed with an inverted arrow-head or roof-shaped concave depressed cutting section (22')

and a cut chip removal surface (29) is formed on the cutter elements adjacent said main cutting edge portions (19').

8. The tool of claim 7, wherein each of said main cutting edge portions (19') is formed by two essentially straight effective cutting edge sections converging to a lowest dip position.

9. The tool of claim 1, wherein (FIG. 5) the chopped corner cutting edges (22) have a raised shallow roof or arrow-head convex shape.

10. The tool of claim 1, wherein said fluted cylindrical body (1) is devoid of support elements radially engageable against an inner wall of the bore hole (40) produced by the boring tool.

11. The tool of claim 1, wherein said cutter elements (10) are essentially of octagonal shape having four regularly repeating side surfaces (14);

and wherein each side surface is roof-shaped and projects outwardly, said roof-shaped side surfaces forming side surface sections joined at a connecting line (16), said connecting line being located centrally between the cutting corners (23).

12. The tool of claim 11, wherein said cutter elements are plate-like elements having a central attachment hole (12) and defining a theoretical contacting plane (24) extending perpendicularly through an axis of said attachment hole;

wherein said side surfaces (14) are subdivided in side surface sections (17, 18) along a plane (16a) essentially parallel to said theoretical contacting plane;

one (17) of said side surface sections forming, at an edge of said plate-like element, said main cutting edges (19);

and wherein said side surface sections project outwardly with respect to said attachment hole and form an obtuse angle (21) with respect to each other in shallow roof-shaped form.

13. The tool of claim 1, wherein the inner cutter element (10b) is positioned on the body (1) with its main cutting edge portion (19) oriented along a diametrical line with respect to said theoretical circle (33).

14. The tool of claim 10, wherein at least one of said cutter elements (10a, 10b) is positioned on said body to define, with respect to the axis (31) of said cylindrical body, an acute angle (35a, 35b) passing through the axis of rotation of the body, whereby said at least one cutter element will be located in tipped or tilted position on said body.

15. The tool of claim 1 wherein at least one of said cutter elements (10a, 10b) is positioned on said body to define, with respect to the axis (31) of said cylindrical body, an acute angle (35a, 35b) passing through the axis of rotation of the body, whereby said at least one cutter element will be located in tipped or tilted position on said body.

16. The tool of claim 15, wherein the outer cutter element (10a) is positioned on said tool body (1) such that said acute angle (35a) is located at the side of said diametrical plane (34) which is trailing with respect to the diametrical plane (34), with respect to the direction of rotation of said tool.

17. The tool of claim 15, wherein said acute angle (35a, 35b) has a magnitude of between 0° to about 12°.

18. The tool of claim 4, wherein said acute angle is in the order of about 6°.

19. The tool of claim 1, wherein the inner cutter element (10b) is positioned on the body (1) with its main cutting edge portion (19) oriented along a chord with respect to said theoretical circle.

* * * * *

UNITED STATES PATENT AND TRADEMARK OFFICE
CERTIFICATE OF CORRECTION

PATENT NO. : 5,049,011
DATED : September 17, 1991
INVENTOR(S) : BOHNET et al It is certified that error appears in the above-identified patent and that said Letters Patent is hereby corrected as shown below:

Title page, Section [73] Assignee -

Change: "Cubic Defense Systems Inc., San Diego, Calif." to

--Montanwerke Walter GmbH
  Derendinger Strasse 53
  D-7400 Tubingen
  Fed. Rep. Germany--

Title page, right-hand column, after "Assistant Examiner", insert: --Attorney, Agent, or Firm: Frishauf, Holtz, Goodman & Woodward--.

Signed and Sealed this

Sixteenth Day of February, 1993

*Attest:*

STEPHEN G. KUNIN

*Attesting Officer*   *Acting Commissioner of Patents and Trademarks*